R. E. House,
Water Filter.
N° 4,593. Patented June 27, 1846.
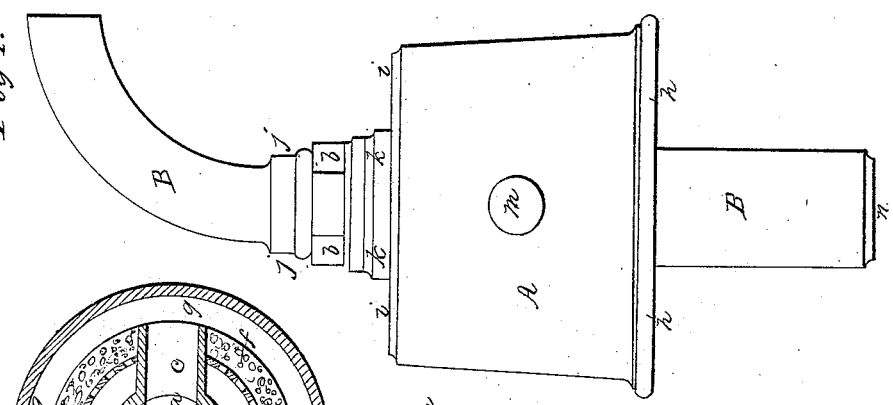
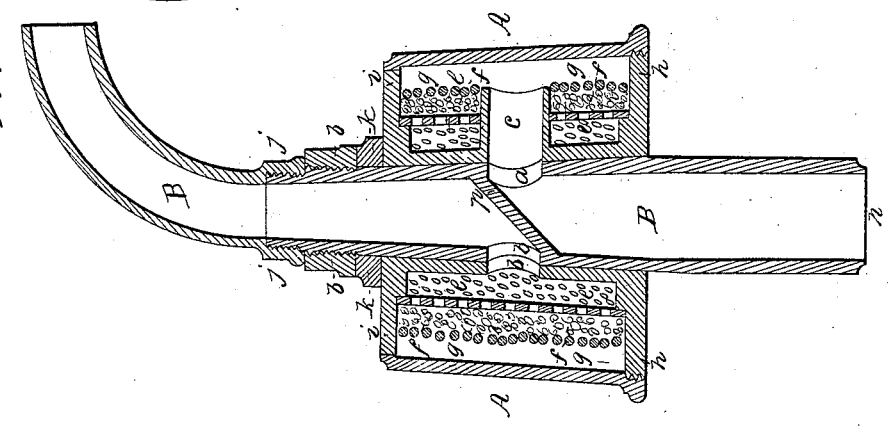

UNITED STATES PATENT OFFICE.

ROYAL E. HOUSE, OF NEW YORK, N. Y., ASSIGNOR TO WILLIAM BALLARD, OF NEW YORK, N. Y.

STOP-COCK FOR FILTERING.

Specification of Letters Patent No. 4,593, dated June 27, 1846.

*To all whom it may concern:*

Be it known that I, ROYAL E. HOUSE, of the city and State of New York, have invented a new and useful Apparatus for Filtering Water and other Liquids, which I denominate House's Filter; and I do hereby declare that the following is a full and exact description thereof.

Said apparatus or filter is so constructed that water or other liquid received into the end of a partition pipe, flows to near the center of the pipe where it is discharged through a hole in the side thereof, into a chamber formed in the body of the apparatus, and passes thence through a sponge or other suitable strainer, into an outer chamber, and thence through a short tube, into a hole in the other side of the partition pipe, connecting with the end of the pipe opposite to that in which the liquid was admitted, and is then discharged ready for use.

Figure 1 of the drawings hereunto annexed and forming part of these specifications is an elevation of the apparatus or filter, when all together ready for operation. Fig. 2 is a vertical cut section thereof and Fig. 3 is a horizontal cut section.

The apparatus consists chiefly of the body A of a cylindrical form, with the pipe B passing through an axial aperture, and on which pipe the body or cylinder A may revolve. The pipe B has a partition $p$ near the center, standing in an oblique position across the caliber of the pipe, so that the caliber of the pipe on each side of said partition, will terminate with the openings or holes $a$ and $b$ which are in range with each other on opposite sides of the partition pipe, and communicate with the small tubes $c$ and $d$—these openings in the pipe are simply holes through the sides thereof connecting the interior with the tubes $c$ and $d$ so that the pipe may be turned, without any obstruction when necessary. $e$ is an inner chamber formed by the cylinder which forms the axial aperture, through which the pipe A passes, on one side; and on the other by a cylinder, perforated to admit of the liquid passing through it. $f$ is a layer of sponge or other suitable substance to form a strainer, placed upon the outside of said perforated cylinder; this is designed to filter the liquid and may be rendered compact, and held secure, by being wound with cord or wire. $g$ is the outer chamber which is formed on one side by the sponge or other substance $f$ and on the other by the exterior cylinder A, which is the exterior of the body part above mentioned; the cylinder A is smaller at one end than the other and screws on to the larger head or end $h$ and should pass over and fit water tight upon the smaller head or end $i$, which may be done by introducing in the joint a layer of suitable packing; both of these heads or ends are firmly soldered to the ends of the other above mentioned cylinders. The pipe B is also larger in diameter at one end than at the other, and is in two parts the bent part being screwed on to the other at $j$ which is for the convenience of taking it apart and putting it together. The larger end of the pipe must fit tight into the cylinder, and the washer $k$ is fitted upon a square shoulder on the pipe; the nut $l$ is screwed on to the tube and down to the washer $k$ and the bent part of the pipe is screwed down to the nut $l$. This arrangement admits of the cylinders or body A turning on the pipe B, and the handle or pin $m$ is soldered to the cylinder for the convenience of so turning it.

In using this filter, the water or other liquid is admitted at the end $n$ of the pipe and when the pipe is in the position represented by Fig. 2 the water will pass through the tube $c$ into the outer chamber $g$—it will then pass through the sponge and the perforated cylinder, into the inner chamber, from which it will return through the tube $d$ into the pipe on the other side of the said partition and be discharged from the bent end of said pipe. The filter may be used in this position until the impurities or filth strained out of the liquid, has accumulated in the outer chamber so that it becomes necessary or is desirable to clean it—this may be done by giving the body or cylindrical part A half of one revolution on the pipe B by which the tubes $c$ and $d$ will have changed places; that is the tube $d$ will come opposite to, and receive the water or other liquid from the orifice $a$ in the side of the pipe B, which will pass first into the inner chamber $e$—thence through the sponge or other strainer $f$, into the outer chamber $g$ whence it will be conducted by the tube $c$ into the pipe B on the opposite side of the partition and be discharged from the bent end of said pipe. It will be observed that by thus revolving the body half round and the tubes $c$ and $d$ changing places, the direction of the water through the apparatus is reversed, so that as soon as the change is effected the accumulated filth will be discharged and the strainer cleaned, and thus it may be changed from one position to the other as often and whenever thought necessary, with perfect ease. It is also to be observed that the large end of the pipe B is to be suitably attached to a pipe to receive the water; a small pressure of the water will be found sufficient to force it through the apparatus.

The apparatus may be made of brass or of any other suitable materials and of any desired dimensions.

It is also further to be observed, that in the use of the filter no faucet is necessary, as by turning the body or cylinder A one-quarter of one revolution on the pipe B the orifices $a$ and $b$ will be closed and the liquid will be shut off, and can not enter either the tube $c$ or $d$, and that it may again be put into operation by so turning it that the liquid will enter either the tube $c$ or $d$—and thus the filter may be closed or used with the greatest convenience.

What I claim as my invention and desire to secure by Letters Patent, is—

The combination of the partition pipe B with the chambers $g$ and $e$ by means of the tubes $c$ and $d$ in the manner and to produce the effect above pointed out.

ROYAL E. HOUSE.

Witnesses:
 GEO. GIFFORD,
 MILES B. ANDRUS.